United States Patent Office 2,914,583
Patented Nov. 24, 1959

2,914,583

PROCESS FOR PRODUCING DURENE OF AT LEAST NINETY-NINE PERCENT PURITY COMPRISING PASSING INERT GAS THROUGH A DURENE CAKE AFTER SOLVENT WASHING SAID CAKE TO NINETY TO NINETY-EIGHT PERCENT PURITY

Russell W. Walker, Lansing, Ill., assignor to Sinclair Refining Company, New York, N.Y., a corporation of Maine No Drawing. Application April 26, 1956
Serial No. 580,701

7 Claims. (Cl. 260—674)

My invention relates to a process for recovering durene from a hydrocarbon mixture. More particularly, this invention is directed to the separation of a substantially pure durene product from close-boiling aromatic hydrocarbons through obtaining durene crystals admixed with the aromatic hydrocarbon impurities and a non-aromatic organic solvent containing up to about 8 carbon atoms, and then separating solvent and entrained impurities from the crystal mass by evaporation under non-equilibrium conditions.

It is highly desirable from a commercial standpoint to obtain durene in substantially pure form. There is considerable interest in employing durene as a starting material for producing macromolecules. The higher the purity of durene the greater will be the chance that its derivatives can be prepared or separated in substantially pure form to enhance the utility of the product in manufacturing macromolecules. Increases in purity of less than one percent can be important when the product contains more than 95 weight percent of durene. Among the durene derivatives which can be employed in producing macromolecules is dimethylol durene which provides polyesters of high melting point and of a considerable tendency to crystallize. Other intermediates which can be employed are diepoxides and dimethacrylate made from the dimethylol derivative, diisocyanates of durene and esters of pyromellitic acid.

Oxidation products of durene, such as pyromellitic acid and its dianhydride, can be polymerized to form materials suitable for the manufacture of synthetic fibers. In obtaining polymers of good length having substantially no undesirable cross-linking, a substantial absence of monomers containing more or less than 4 carboxyl groups on the benzene ring and those having 4 carboxyl groups in positions other than the 1, 2, 4 and 5-positions is desirable. For instance, if monomers containing less than 4 carboxyl groups are present, the polymers are found to be structurally weakened. The presence of monomers having more than 4 carboxyl groups is found to result in polymers having undesirable cross-linkage. To obtain pyromellitic acid or dianhydride monomers of high purity, it is advantageous to oxidize substantially pure durene, for the oxidation of less pure durene containing close-boiling $C_{10}$ or other hydrocarbons results in contaminated oxidation products. Separation of these impurities from the desired monomers necessitates the employment of difficult and costly methods.

In one aspect, I provide a process for purifying durene crystals obtained by crystallization from a hydrocarbon fraction, wherein the durene crystals are associated with impurities, such as other aromatic hydrocarbons in the crystallization mother liquors. The crude crystal mass is washed with a non-aromatic organic solvent to remove a substantial portion of the impurities to increase the purity of the crystal mass to about 90 to 98 mol percent durene. Then the purity of the durene crystals is further increased by subjecting the mass to a non-equilibrium evaporation step wherein remaining solvent is removed and carries with it an additional portion of the impurities. By this process, a product of high purity for instance, of about 99 mol percent or greater of durene, is obtained. I refer to the purity of the durene product or of the crystal mass in terms of solvent-free product, i.e. based on the durene and impurities derived from the feed stock.

Where crystals are solvent washed to remove mother liquors, a solvent is usually selected which is freely miscible with the mother liquor but which will not dissolve the crystals. Otherwise the washing would dissolve and carry away a considerable portion of the desired crystalline product as well as the impurities. As a practical matter, regardless of the selectivity of the solvent at least a portion of the crystals will be lost as washing continues. Also, as the purity of the product increases, it takes larger quantities of solvent to accomplish any purification. Due to practical limitations as to the dryness of the durene crystal cake obtained as by centrifugation, the cake would have to be washed until the residual solvent contains less than one part of mother liquor per three hundred parts of solvent if the durene were to have a purity of at least about 99 mol percent. When trying to obtain products of high purity as I desire, the loss of yield becomes economically prohibitive by this procedure. Thus, I continue washing until the crystalline mass is at least about 90 to 98 mol percent durene, preferably from about 95 to 98 mol percent, and final purification cannot be economically accomplished by further washing.

I have found that this final purification can be effected without appreciable loss of yield providing the solvent be removed from the crystals by non-equilibrium evaporation. Surprisingly, as the solvent leaves the crystals, mother liquor impurities are carried with it to provide my high purity product. Not only does this system give a higher yield of the substantially pure product compared with that obtained from solvent washing to the desired purity, but in addition my method avoids the expense of the increased amount of solvent and its recovery.

The necessity for employing my non-equilibrium evaporation step was established by trying to obtain high purity durene by other methods such as fractional distillation and recrystallization from a melt of the crystals. In this latter process, the yield of durene was down to about 55 to 60 mol percent at about 95 percent purity and the yield was dropping fast as purity increased. In the fractional distillation process, the yield was about 70 mol percent at 95 percent purity but here again yield was on a fast decline as purity rose. Even if the crude durene crystal mass be carried to 90 to 98 percent purity by solvent washing, the use of these fractional distillation or recrystallization procedures in trying to accomplish final purification will either fail entirely or result in marked decreases in yield. Thus, the success of my process is dependent upon effecting the final purification by non-equilibrium evaporation of solvent and the associated impurities, and depending upon the selection of non-aromatic solvent yields can be as high as 80 to 85 mol percent.

More specifically, my process can comprise cooling a durene-containing aromatic hydrocarbon feed, preferably boiling in the range between about 350° and 425° F., to crystallize substantially only the durene in the fraction. Durene crystals are separated from the bulk of the mother liquor by a liquid-solid separation procedure, e.g. centrifugation, and the crystals having mother liquor associated therewith are washed with a non-aromatic organic solvent containing up to about 8 carbon atoms, which has little or no solvency for durene and is miscible with crystallization mother liquor at the wash temperature, to increase the purity of the crystal mass to about 90 to 98 weight percent durene. Solvent and minor traces of mother liquor impurities are then removed from the mass by simultaneous evaporation under non-equilibrium conditions to obtain a durene product having a purity of about 99 mol percent or greater of durene. Economically, the bulk of the solvent would be separated from the crystals as a liquid, and only that portion remaining with the crystal mass after the liquid-solid separation was effected would be removed by evaporation. Thus, ordinarily the dryness of the mass subjected to the evaporation step is such that it contains less than about 50 weight percent of solvent, and commercially it is doubtful if it is practical to obtain less than about 2 weight percent of solvent in the cake before evaporation.

The present invention has application to obtaining durene from aromatic hydrocarbon fractions, particularly those boiling in the range between about 350° and 425° F. obtained by the distillation of crude petroleum, catalytic or thermal cracking, reforming or alkylation operations, or from other operations producing aromatic concentrates. A preferred crystallizer feed is a naphtha reformate fraction or a fraction of alkylated aromatics, obtained, as for example, by the alkylation of xylene and pseudocumene. The feed stock most advantageously will have a boiling range between about 370° and 400° F. and contain at least about 5 weight percent durene. The crystallizer feed may contain up to about 70 percent or even more of durene.

The temperature to which a feed stock must be cooled to crystallize durene depends upon the durene concentration of the feed. The lower the concentration of durene in the feed, the lower will be the temperature required to crystallize durene in quantity. Since yield of durene depends to a substantial degree upon the quantity of durene crystallized, I preferably cool the feed stocks I employ to temperatures at which substantially all, i.e. about 90 weight percent or more, of the durene in the feed is in the solid phase. When employing crystallizer feeds containing relatively small amounts of durene, e.g. about 5 weight percent, temperatures as low as about —100° F. are generally required. On the other hand, crystallization temperatures in the range between 0° and 32° F. are generally sufficient to crystallize substantially all of the durene from aromatic hydrocarbon feeds containing 60 weight percent or greater of durene.

Durene crystals are separated from the cooled fraction or mother liquor by centrifugation, filtration, or similar methods wherein mother liquor is removed as a liquid from the solid crystals. The separation step is preferably conducted at the crystallization temperature or only slightly thereabove to prevent loss of durene to the solubilizing mother liquor.

The impurities of the crude durene crystals consist substantially entirely of mother liquor. By washing the impure durene crystals with certain non-aromatic organic solvents, the purity of the crystals is readily increased to about 90 or 95 to 98 weight percent durene. The quantity of solvent required to obtain this purity depends to a large extent upon the selectivity of the particular solvent employed at a particular wash temperature. As little as 3 volumes of solvent per volume of crystals are generally sufficient with solvents having a high selectivity, where as a greater quantity of a less selective solvent may be required to obtain the desired degree of purity. Preferably, the durene crystals are washed at the crystallization temperature or slightly thereabove. By so doing, loss of durene to the solubilizing mother liquor is effectively prevented. According to one embodiment of my invention, washing of the crystals is begun at about the crystallization temperature and the temperature is somewhat increased as the washing proceeds. Since a considerable portion of the solubilizing mother liquor is removed at the lower temperature, good yields of durene of increased purity are obtained by this procedure. At the completion of the washing operation, the bulk of the solvent employed can be removed from the crystals by separation of the liquid solvent from the solid crystals as by simple filtration or centrifugation. This leaves a wet crystal cake from which the residual solvent is removed along with additional impurities by the non-equilibrium evaporation step. Of course, the entire solvent removal could be effected by evaporation but generally this would involve needless expense.

The extractive materials or solvents I employ are non-aromatic organic solvents containing up to about 8 carbon atoms which are miscible with the crystallization mother liquors at the wash temperature. Suitable non-aromatic extractive solvents include lower aliphatic hydrocarbons such as paraffins, olefins, alcohols, ketones, ethers, esters, and cyclic hydrocarbons such as cycloparaffins. For example, among the paraffins, olefins and cycloparaffins are those containing 3 to 8 carbon atoms such as propane, butane, pentane, propene and cyclopentane. Among suitable aliphatic alcohols are those containing 1 to 5 carbon atoms such as methyl alcohol and isopropanol. Aliphatic ketones containing 3 to 6 carbon atoms, such as acetone and methyl isobutyl ketone, are examples of suitable ketones. Also, I can use lower saturated and unsaturated chlorinated aliphatic hydrocarbons such as olefins and paraffins, e.g. ethylene dichloride, methyl chloride, carbon tetrachloride, ethyl chloride, trichloroethylene, and tetrachloroethylene. Among useful aliphatic esters are those containing 4 to 7 carbon atoms such as amyl acetate, isopropyl acetate, and ethyl acetate. Typical of the ethers and nitriles I employ are ethyl ether and acetonitrile. Mixtures of these solvents can also be employed, and successive washes with different solvents are effective. Among the preferred solvents are methanol and isopropanol.

My non-equilibrium evaporation step can be accomplished by several means as by suddenly decreasing the pressure of the atmosphere about the crystal mass, i.e. by flashing, by passing through the crystals a gas inert to durene under conditions of contact, or by increasing the temperature of the crystal mass without effecting melting of the crystals. For example, if the solvent employed is a light aliphatic hydrocarbon such as propane, which is a gas under room conditions, mere warming of the crystals from the crystallization temperature to room temperature will effect evaporation of propane and entrained mother liquor from the crystals. Likewise, propane can be flashed from the crystals by reducing pressure. If, for example, methanol or isopropanol, which materials are liquids under room conditions, are employed as solvents, evaporation of solvent is preferably effected by air drying at ambient temperature. Other inert gases might be employed such as nitrogen. The utilization of a foraminous drum dryer is particularly desirable in evaporation of solvent by inert gas contact.

The advantages of my process are further illustrated by the following example. A fraction boiling in the range between 385 and 390° F. and analyzing 35 percent by weight of durene was obtained by fractional distillation of a reformate, obtained by reforming a Mid-Continent straight run naphtha, in a fractionating column rated at approximately 40 plates. A 113 gram aliquot of this fraction was cooled while stirring to —30° F. The resulting slurry was maintained at the crystallization temperature for about 0.25 hour and then transferred to a Buchner type funnel which had been previously solvent-cooled to —30° F. 17.5 grams of mother liquor were filtered off at —30° F., and the impure durene cake was washed with a total of 100 g. of isopropanol at —30° F. The durene crystals were warmed to about 74° F. and filtration was continued during warming. 50 grams of solid, still damp with isopropanol and mother liquor, were thus obtained on the filter. The cake was divided into two portions. One portion weighing about 28 grams was distilled and redistilled in a 6 inch Vigreaux type column to separate solvent from durene. 18.8 grams of a durene product, representing a yield of 79.5 percent by weight of durene based on feed and having a purity of 95 mol percent durene were obtained. The second portion weighing 22 grams was allowed to remain on the filter and solvent was flash evaporated from the crystals by pulling air through the crystal cake for about 0.25 hour. 15.0 grams of a durene product, representing a yield of 84.6 percent by weight of durene based on feed and having the purity greater than 99 mol percent durene, were obtained.

As can be seen by this example my non-equilibrium evaporation purification procedure produced a durene product of significantly greater purity than obtained when using fractional distillation as the final purification step following a preliminary solvent wash. Also, in this example my method gave a significantly better yield.

Table I sets forth the results of several examples of the process of this invention employing various solvents, which examples were carried out in a manner similar to that described in detail in the specific example above.

the so partially purified durene crystals could be mixed with a solvent of the character I employ for washing and then the solvent and associated impurities removed by my non-equilibrium evaporation operation.

This application is a continuation-in-part of my co-pending application, Serial No. 487,208, filed February 9, 1955, now abandoned.

It is claimed:

1. In a process for separating durene of at least about 99 mol percent purity from a durene-containing aromatic hydrocarbon fraction boiling in the range between about 350° F. and 425° F., the steps comprising cooling the fraction to crystallize durene, separating durene crystals from the cooled fraction, washing the crystals with a non-aromatic organic solvent containing up to about 8 carbon atoms to purify the crystals to about 90 to 98 mol percent durene based on durene and impurities from the aromatic hydrocarbon feed, removing the bulk of the solvent from the crystals by liquid-solid separation, and passing inert gas through the impure crystals for a time sufficient to remove solvent and impurities from the crystals and provide durene of at least about 99 mol percent purity.

Table I

| Example | 1 | | 2 | | | 3 | | 4 | 5 | 6 | 7 | 8 |
|---|---|---|---|---|---|---|---|---|---|---|---|---|
| Feed: | | | | | | | | | | | | |
| Reformate boiling range, °F | 361–397 | | 381–391 | | | 370–397 | | 383–391 | 370–397 | 370–397 | 370–397 | 361–397 |
| Wt. Percent Durene | 10.8 | | 28.0 | | | 19.0 | | 28.0 | 19.0 | 19.0 | 19.0 | 10.8 |
| Grams | 53.3 | | 29.8 | | | 28.3 | | 32.1 | 41.5 | 37.2 | 66.0 | 35.0 |
| Crystallization: Temp., °C | −78 | | −35 | | | −60 | | −50 | −60 | −60 | −60 | −78 |
| Initial Solid: | | | | | | | | | | | | |
| Grams | 27.6 | | 20.8 | | | 16.8 | | 24.0 | 21.2 | 20.1 | 36.1 | 17.5 |
| Wt. Percent Durene | 25 | | 40 | | | 32 | | 37 | 36 | 34 | 34 | 23 |
| Solvent | Acetone | | Isopentane | | | Propane | | Trichloroethylene | Ethyl Acetate | Ethyl Ether | ⅔ MeOH ⅓ n-C₅H₁₂ | (³) |
| Vol. cc | 55 | | 40 | 85 | | 35 | | 50 | 40 | 40 | 60 | |
| Final Purification: | | | | | | | | | | | | |
| Procedure ¹ | A | B | A | B | B | A | B | A | A | A | A | A |
| Purity, mol. percent ² | 99 | 96 | 99 | 97 | 99 | 99 | 96 | 99 | 99 | 99 | 99 | 99 |
| Durene yield, mol. percent of theory | 74.7 | 75.2 | 72.0 | 74.8 | 52.0 | 81.2 | 80.7 | 77.2 | 73.8 | 73.1 | 75.4 | 80.4 |

¹ A—non-equilibrium evaporation by passing air through the cake; B—fractional distillation.
² 99 mol percent purities reported are minimum purities.
³ Washed with 30 cc. pentane at −78° C., then with 5 cc. MeOH at +25° C.

From the results set forth of Table I, it is apparent that if final purification of the durene crystal mass is effected by my non-equilibrium evaporation, substantially pure durene is obtained. The evaporation step purifies the crystals to about 99 mol percent or greater of durene by removal of mother liquor impurities, whereas fractional distillation methods, although effective for removing solvent, apparently do not increase the purity of the solvent washed crystals. For instance, non-equilibrium evaporation of isopentane from 97 mol percent durene filter cake of laboratory dryness entrained sufficient quantities of mother liquors to produce 99 mol percent durene. On the other hand, fractional distillation of the cake yielded only 97 mol percent durene since the isopentane was separated from the mother liquor impurities as well as the durene. Only by increasing the volume of the isopentane wash by about 110 volume percent was it possible to produce 99 mol percent durene without the non-equilibrium evaporation operation.

The non-equilibrium evaporation of my present invention is thus effective in removing small amounts of close-boiling aromatics and my selective solvent from a durene crystal mass to obtain a product of high purity. Although I prefer to effect a solvent wash of the mass to reach at least about 90 or 95 to 98 percent purity before employing the non-equilibrium evaporation, the preliminary purification can be accomplished by other procedures such as fractional melting or recrystallization procedures but disadvantages such as loss of yield accrue. Thus, 2. In the process of claim 1 in which the inert gas is air.

3. In the process of claim 2 in which the non-aromatic organic solvent is isopropanol.

4. In the process of claim 2 in which the non-aromatic organic solvent is methanol.

5. In the process of claim 2 in which the non-aromatic organic solvent is isopentane.

6. In the process of claim 1 in which the durene crystals separated from the cooled fraction are washed with the solvent to purify the crystals to about 95 to 98 mol percent durene based on durene and impurities from the aromatic hydrocarbon feed.

7. In the process of claim 6 in which the inert gas is air.

References Cited in the file of this patent

UNITED STATES PATENTS 2,560,373   Schmidl   July 10, 1951
2,625,555   Miller   Jan. 13, 1953
2,766,310   Bennett et al.   Oct. 9, 1956

OTHER REFERENCES

Smith et al.: Journal American Chemical Society, volume 51, pages 3001–3008 (1929), pages 3001 and 3007 only, needed.

Norris: Experimental Organic Chemistry, 2nd edition, pages 7 and 8, published by McGraw-Hill Publishing Company, 330 West 42nd Street, New York, N.Y.